US012171336B2

(12) United States Patent
Egaña Arrieta

(10) Patent No.: US 12,171,336 B2
(45) Date of Patent: Dec. 24, 2024

(54) DISPLAY SYSTEM FOR COUPLING TO VISUAL COMMUNICATION PRODUCTS

(71) Applicant: Joseba Egaña Arrieta, San Sebastián (ES)

(72) Inventor: Joseba Egaña Arrieta, San Sebastián (ES)

( * ) Notice: Subject to any disclaimer, the term of this patent is extended or adjusted under 35 U.S.C. 154(b) by 93 days.

(21) Appl. No.: 18/098,794

(22) Filed: Jan. 19, 2023

(65) Prior Publication Data

US 2023/0232980 A1 Jul. 27, 2023

(30) Foreign Application Priority Data

Jan. 21, 2022 (ES) ............................ ES202230095U

(51) Int. Cl.
*A47B 96/06* (2006.01)
*A47F 11/10* (2006.01)
*G09F 13/04* (2006.01)

(52) U.S. Cl.
CPC ............ *A47B 96/061* (2013.01); *A47F 11/10* (2013.01); *G09F 13/0413* (2013.01)

(58) Field of Classification Search
CPC ........... A47B 96/061; A47B 2220/0077; A47F 11/10; A47F 5/0043; G09F 13/0413; G09F 23/06; G09F 3/204
See application file for complete search history.

(56) References Cited

U.S. PATENT DOCUMENTS

| | | | | |
|---|---|---|---|---|
| 479,424 A * | 7/1892 | Huff | A47B 96/061 | 248/225.11 |
| 577,430 A * | 2/1897 | Hurd | A47B 96/061 | 248/247 |
| 593,920 A * | 11/1897 | Boland | A47B 96/061 | 160/339 |
| 5,205,524 A * | 4/1993 | Cohen | F16B 7/14 | 248/222.51 |
| 5,896,721 A * | 4/1999 | Sugiyama | F16B 9/058 | 52/712 |
| 6,085,916 A * | 7/2000 | Kovacevic | A47F 5/0815 | 211/87.01 |
| 6,631,813 B1 * | 10/2003 | Walter | A47F 5/0846 | 211/90.01 |
| 6,976,557 B2 * | 12/2005 | Becker | E04G 5/14 | 182/113 |
| 8,348,210 B1 * | 1/2013 | Lee | A47B 57/22 | 248/224.7 |
| 9,004,427 B2 * | 4/2015 | Irudayaraj | A47B 96/061 | 211/144 |

(Continued)

*Primary Examiner* — Ko H Chan
(74) *Attorney, Agent, or Firm* — Collard & Roe, P.C.

(57) ABSTRACT

A display system for coupling to visual communication products has a frame and a display surface, wherein the display system presents a coupling device for coupling to the frame, associated with an accessory that can be manually coupled and decoupled, defining a support. For this purpose, the coupling device presents a flattened body, of a length according to the thickness of the frame, having an end front flange which determines an elbow, and which defines an insertion groove in the profile of the frame, having at its opposite end an elastically deformable rear clipping flange. In this way, the coupling device presents on its front side edge an opening defined by a semi-sphere acting as a positioning pin where the accessory is coupled.

8 Claims, 6 Drawing Sheets

(56) References Cited

U.S. PATENT DOCUMENTS

| | | | | |
|---|---|---|---|---|
| 9,326,414 | B2 * | 4/2016 | Eberle, Jr. | H05K 7/1491 |
| 9,456,692 | B2 * | 10/2016 | Tibbe | A47B 96/061 |
| 10,070,723 | B1 * | 9/2018 | Garrity | A47B 95/008 |

* cited by examiner

DISPLAY SYSTEM FOR COUPLING TO VISUAL COMMUNICATION PRODUCTS

CROSS REFERENCE TO RELATED APPLICATIONS

Applicant claims priority under 35 U.S.C. § 119 of Spanish Utility Model No. U202230095 filed Jan. 21, 2022, the disclosure of which is incorporated by reference.

BACKGROUND OF THE INVENTION

1. Field of the Invention

The present invention relates to a composite accessory or set of elements forming a system, which allow increasing the functionality of visual communication products, namely, visual communication products commonly known as advertising light boxes or smart frames.

The object of the invention is to provide means for increasing the technical and functional capabilities of visual communication products in a simple manner and without the need to use tools.

More specifically, the invention makes it possible to increase the visual communication capacity of the well-known light boxes, while providing the possibility of transforming it into a display product such as a shelf, hanger, etc., usually linked to the field of display furniture.

The invention is thus situated in the field of visual communication products, such as graphic frames, light boxes, dynamic light boxes, smart frames, and the like.

2. Description of the Related Art

The field of practical application of the invention is the field of visual communication products, which are mainly used in retail markets.

Light boxes are frequently used in stores or points of sale, where the light box is formed by a frame where textile graphics are displayed as advertising, where said textile covers the surface delimited by the frame. These advertising light boxes have the advantage of allowing the exchange of the textile that shows the advertising, offering great versatility.

The frame delimits a groove in which the edges of the textile are introduced. Likewise, the light box includes an anti-slip element, in the form of a silicone strip, to facilitate the complete attachment and fixing of the textile in the groove of the frame.

The light boxes can optionally include a feedback to enhance the graphic projection of the textile.

If accessories are to be incorporated on the light box, for example, to incorporate shelves or elements of another type that can generate additional advertising surfaces, the frame or metal profile will need to be machined so as to allow the fixing of said accessories.

That is, there are currently accessory solutions for visual communication products on the market, but all of them lack flexibility since, among other things, fixing or machining operations must be carried out with a tool to enable the installation of additional accessories.

In this sense, there has been found to be a need to provide an effective solution that offers a high versatility for light boxes and similar visual communication products, without being necessary to machine the light frames in order to avoid their permanent marking, and thus enable continued use with different configurations.

SUMMARY OF THE INVENTION

The display system for coupling to visual communication products according to the invention solves in a fully satisfactory manner the drawbacks set forth above, based on a highly effective solution, avoiding the machining of the metal profile forming the light box.

More specifically, the present invention enables the assembly of different configurations, providing great versatility of the resulting product and avoiding perforations being made in the frame or profile that would mark it for life.

To that end, the system of the invention is configured as a composite accessory which is formed by two main elements or parts:

- a coupling device for coupling on the frame of the light box, which is the one bearing an illuminated display surface, and
- an accessory which is introduced in the opening of the coupling device and offers a surface for generating support surfaces on the light box or visual communication product.

With regard to the coupling device, the device is in the form of a flattened body, of a length consistent with the thickness of the frame where it is selectively coupled, having an end front flange which determines an elbow that is bent backwards and defines an insertion groove for receiving the profile of the frame. The flattened body has a rear clipping flange at its opposite end for coupling to the frame.

The coupling device includes a deep and narrow opening in correspondence with its front side edge which defines the means for coupling the accessory, which allows generating additional support surfaces.

At least one semi-sphere acting as a positioner or positioning pin and aiding in the coupling of the accessory is established in the opening and in correspondence with one of its inner side walls.

As mentioned above, optionally there can be more than one, e.g., two, internal semi-spheres of the coupling device without this affecting the essence of the invention.

Also optionally, it has been provided that the coupling device can incorporate a horizontal central rib for fixing to the accessory by means of a horizontal groove provided in said accessory.

It should be noted that the coupling device is a part made from a plastic material given that it needs the flexibility and ductility provided by this material so as to be adapted to the different functionalities it provides.

Optionally, the coupling device includes a ferromagnetic disc, a nut in the rear portion, and a countersunk screw so as to be able to fix the mentioned ferromagnetic disc. These elements are optional, given that the absence of these elements does not affect the main operation of the assembly, which can be selectively coupled to the height of the frame deemed appropriate by elastic deformation of its rear clipping flange.

Accordingly, these elements mainly serve for combining the box with other external elements, such as side shelves, determining magnetic fixing means for same, but they do not affect the main operation of the invention, which is to increase the capabilities of the light box itself.

It should be noted that, alternatively, it is viable to couple the side shelves, even in the absence of the ferromagnetic disc, by means of the nut-screw assembly itself present in the coupling device and complementary hardware, since the nut is embedded in the coupling device, allowing a mechanical attachment, in addition to the mentioned magnetic attachment option.

With regard to the accessory, it is formed from a plate made of a mechanically resistant material, preferably obtained in methacrylate, which is introduced in the opening of the coupling device.

This plate will be manually introduced in the opening of the coupling device, including an end flange emerging from its side edge which fits in an internal hollowed out space provided in correspondence with the bottom of the mentioned opening, additionally having at least one hole in which the semi-sphere of the coupling device fits via elastic deformation of the wall of the coupling device.

The accessory thus described can be finished off in correspondence with its end opposite the coupling end, acquiring different geometries, each one being able to offer a different functionality.

The accessory can be made of different materials: plastic, wood, metal, depending on the user's preferences.

While the accessory, preferably made of methacrylate, is being fixed in the opening of the coupling device, it should be noted that the flange of the accessory should not run into the internal half sphere of the coupling device as it slides along the opening. As a result, the flange of the accessory is not vertically aligned with the semi-sphere of the coupling device.

Moreover, when fixing the coupling device on the light box, it should be noted that one of the attachment areas of the coupling device is supported on the silicone bead or strip that is usually present to attach the textile or display surface to the profile or frame of the light box.

Advantageously, the presence of the silicone bead favors the anti-slipping of the coupling device on the metal profile of the light box.

In this sense, it should be noted that the mechanical resistance, strength and solidity of the assembly formed by the coupling component on the frame of the light box has been verified, so that it enables supporting weights firmly on the accessories linked to the coupling component.

Advantageously, the invention is constituted as a complementary system or assembly, which the user can assemble and configure as desired in the light box.

Therefore, the versatility of the present invention allows an increase in the communication and display capabilities of visual communication products, also being an element that can be used to make combinations between said products in a simple manner.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
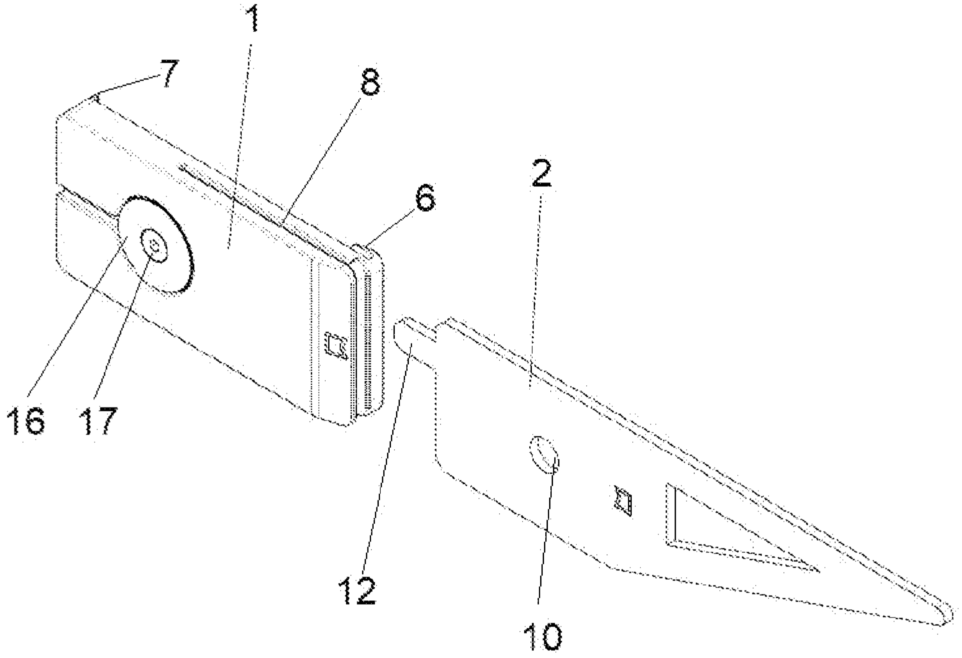
FIG. 1 shows an exploded perspective view of the two main parts in a display system for coupling to visual communication products, carried out according to the object of the present invention.
Figure 2:
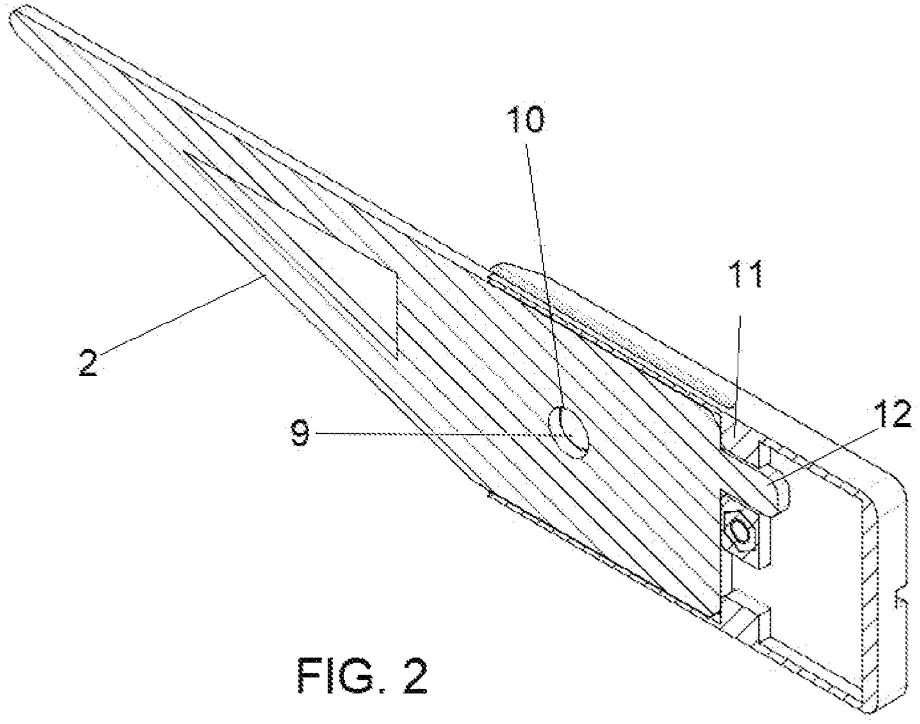
FIG. 2 shows an opposite perspective view of the two elements of FIG. 1 duly coupled to one another and sectioned according to an imaginary plane of longitudinal section.
Figure 3:
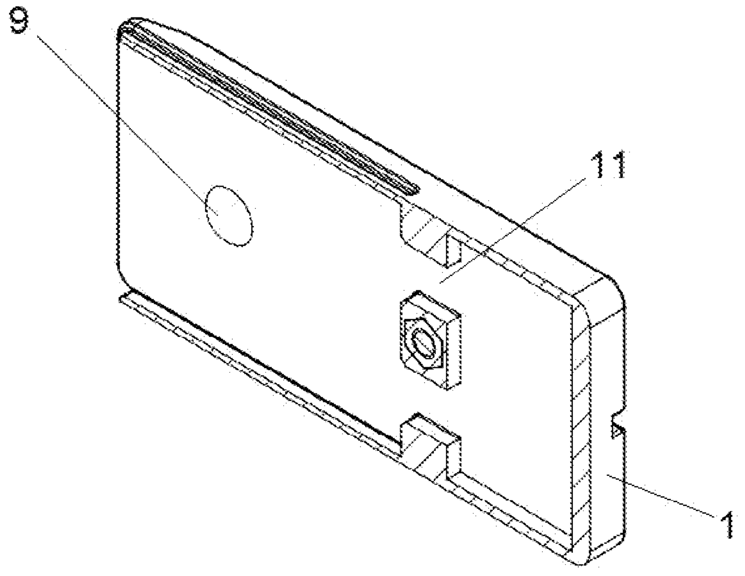
FIG. 3 shows a view similar to the view in FIG. 2, but in which the accessory is not depicted.

In the drawing such as in FIGS. 1-3, it can be seen how hi the system of the invention there are two main parts, a coupling device 1 for coupling on the frame 5 of the light box (see in FIG. 4), and an accessory 2, which can be manually coupled to and decoupled from the latter, which defines the support for additional applications, such as the inclusion of shelves 3 on a display surface 4 of the light box.

Figure 4:
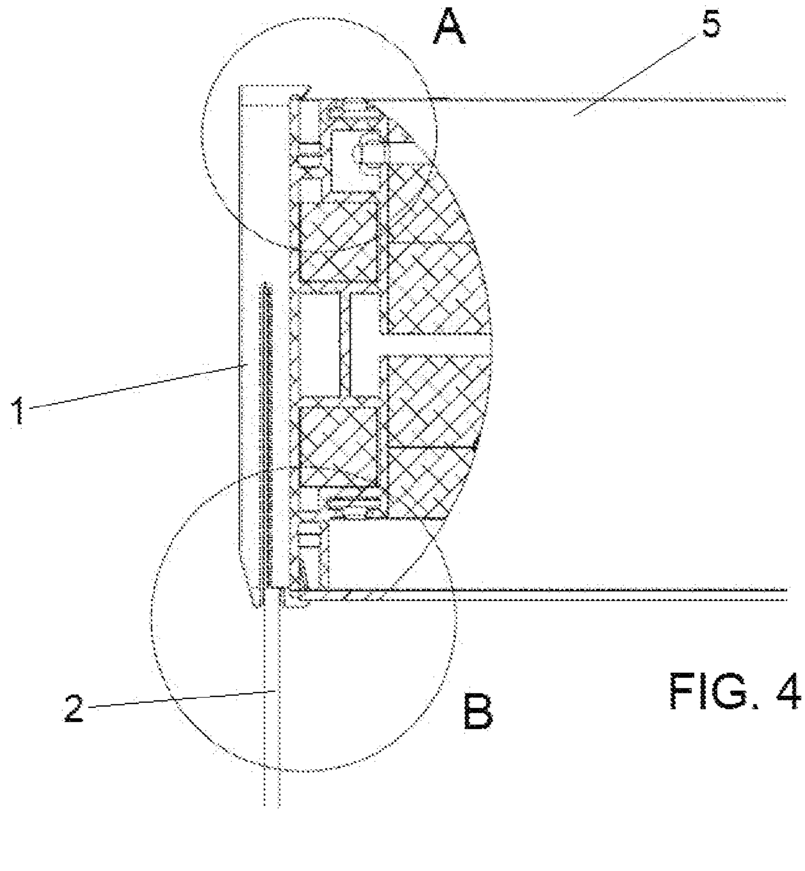
FIG. 4 shows a partially sectioned plan view of the device of the invention coupled to the frame of an advertising light box.
Figure 5:
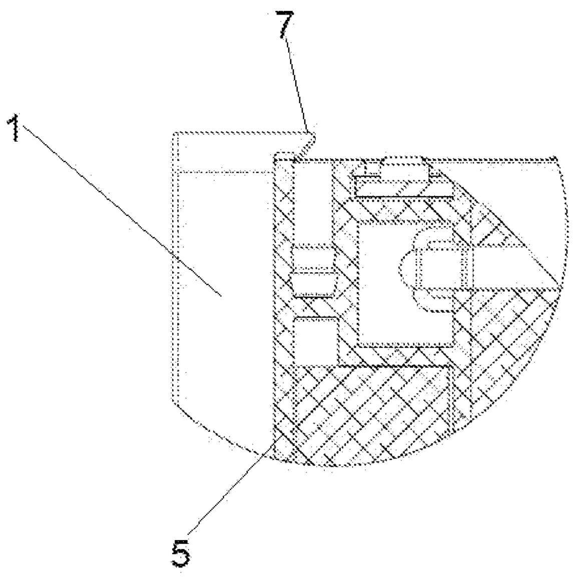
FIG. 5 shows enlarged detail "A" of FIG. 4.
Figure 6:
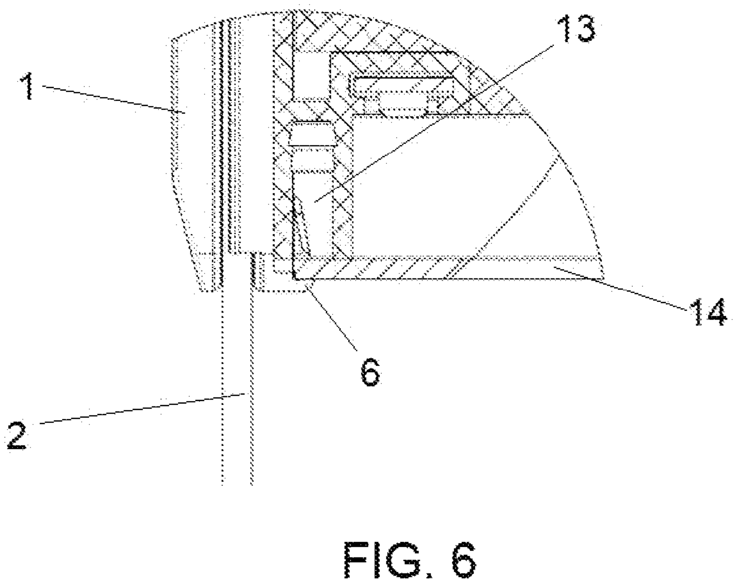
FIG. 6 shows enlarged detail "B" of FIG. 4.

Coupling device 1 is in the form of a flattened body, of a length consistent with the thickness of frame 5 where it is selectively coupled, having an end front flange 6 that is bent backwards and defines an insertion groove for receiving the profile of frame 5, having at its opposite end an elastically deformable rear clipping flange 7, which is configured for a selective coupling to frame 5, and which can be seen in detail in FIGS. 4 to 6.

Returning again to the structure of coupling device 1, it has been provided that it includes a deep and narrow opening 8 in correspondence with its front side edge which defines the means for coupling accessory 2.

Opening 8 has at least one semi-sphere 9 acting as a positioning pin on one of its side walls, which fits in a circular hole 10 provided in accessory 2 due to elastic deformation of the wall during insertion of accessory 2, opening 8 also having in correspondence with its bottom at least one hollowed out space 11 in which there is intended to be inserted a flange 12 emerging from the side edge of accessory 2.

Thus, coupling device 1 will be obtained in a flexible and ductile plastic material.

Accordingly, accessory 2 is formed from a plate made of a mechanically resistant material, preferably obtained in methacrylate, which is introduced in opening 8 of coupling device 1, including at least one end flange 12, which fits in an internal hollowed out space 11 provided in correspondence with the bottom of the mentioned opening 8, additionally having at least one hole 10 in which it fits by elastic deformation of the actual part in which it is integrated, which is the already mentioned semi-sphere 9.

Figure 7:
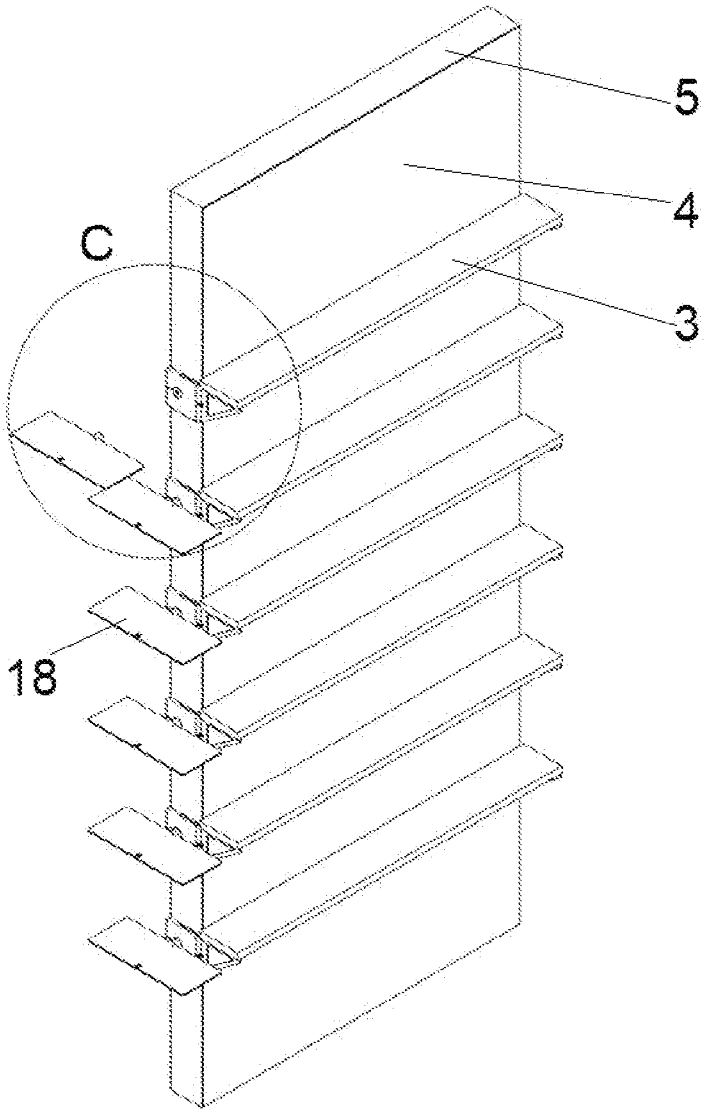
FIG. 7 shows a perspective view of an example application of the system of the invention for applying transverse shelves and side shelves on the frame of an advertising light box
Figure 8:
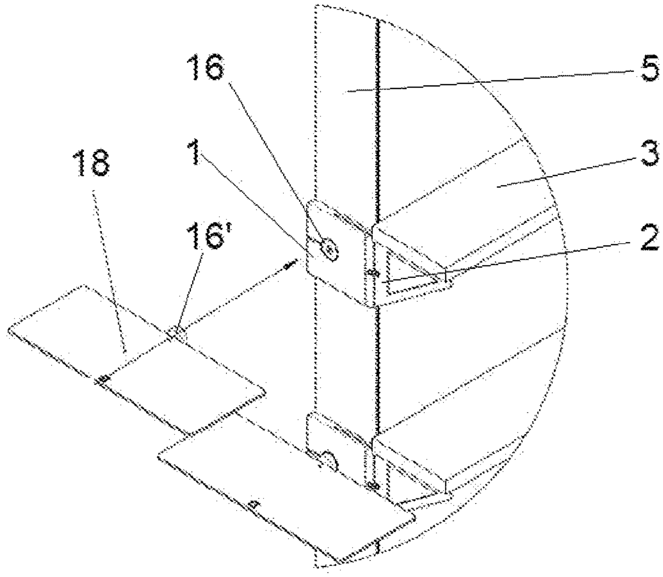
FIG. 8 shows enlarged detail "C" of FIG. 7.

The plate thus described will be prolonged in the front so as to define an overhang on which the end of the corresponding shelf 3 can be arranged, as shown in FIGS. 7 and 8, although this plate can be finished off in correspondence with its end opposite the coupling end, acquiring different geometries, each one being able to offer a different functionality.

As shown in FIGS. 4 to 6, device 1 is adapted to the metal profile of the frame 5 through the front flange 6 and the elastically deformable rear clipping flange 7, such that in addition to being adapted to said metal profile, said front flange is supported on the silicone bead or strip 13 that is usually present to attach the textile 14 to the profile or frame 5 of the light box, which favors the anti-slipping of the coupling device 1 on the metal profile of the light box.

Figure 9:
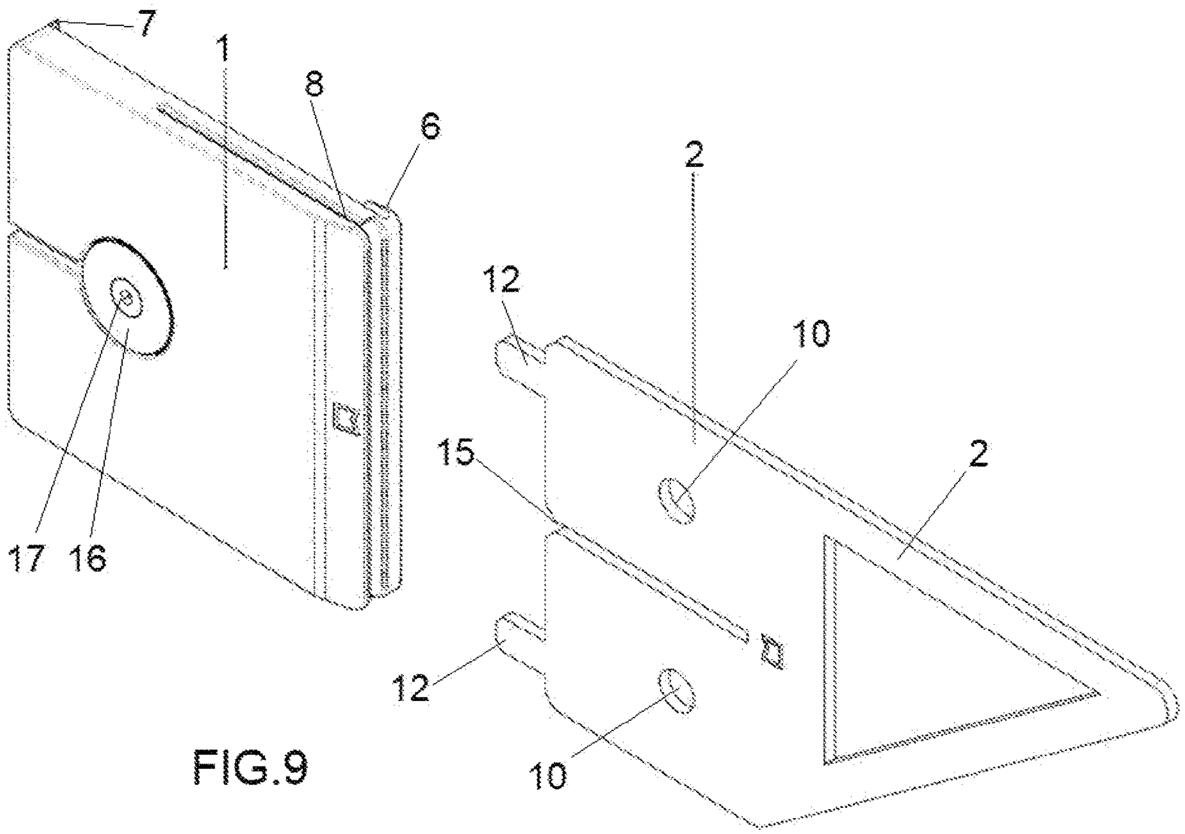
FIG. 9 shows a view similar to the view of FIG. 1 but corresponding to a second embodiment of the invention.
Figure 10:
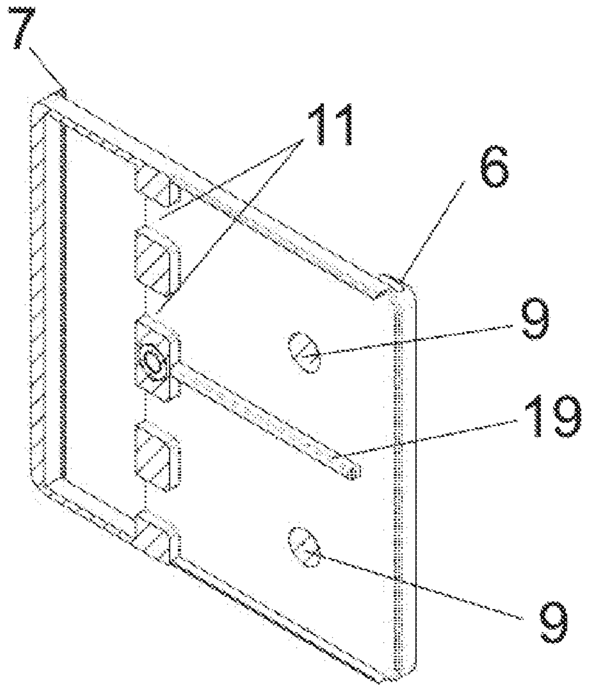
FIG. 10 shows a sectional view of FIG. 9 corresponding to the second embodiment of the invention.

According to the embodiment variant of FIGS. 9-10, accessory 2 can include two holes 10, for which purpose there will be in opening 8 of the coupling device 1 two semi-spheres 9 acting as positioning pins, where said accessory may likewise include two emerging end flanges 12 which likewise fit in two internal hollowed out spaces 11 provided in correspondence with the bottom of opening 8, such that for greater stability in the coupling of the device, the opening can have a horizontal rib 19 which fits in a horizontal groove 15 provided in accessory 2.

In both cases, and also optionally, coupling device 1 may include a ferromagnetic disc 16, which is fixed to its body by means of a nut-screw assembly 17, being flush with its body in the corresponding stepped recess, determining magnetic fixing means for other elements, such as side shelves 18 shown in FIGS. 7 and 8, which will include complementary magnetic means 16' for said coupling.

As described in detail above, in an alternative embodiment of the invention not depicted in the figures attached to this specification, the nut-screw assembly 17 arranged on coupling device 1 allows fixing shelf 18 to coupling device 1 through screws, with a mechanical attachment being made between both elements.

Although only a few embodiments of the present invention have been shown and described, it is to be understood that many changes and modifications may be made thereunto without departing from the spirit and scope of the invention.

What s claimed is:

1. A display system for coupling to visual communication products that have a frame bearing an illuminated display surface, the display system comprising:

a coupling device configured for coupling to the frame, and an accessory in the form of a plate made of a resistant material, which is configured to be manually coupled to and decoupled from the coupling device and which defines a support for other applications on the display surface, wherein the coupling device is in the form of a flattened body that has a length equal to a thickness of the frame, the flattened body having a front end and an opposite rear end, a front flange forming an elbow on the front end, which defines an insertion groove configured for receiving a profile of the frame, and an elastically deformable rear clipping flange on the opposite rear end, which is configured to be coupled to a profile of the frame, wherein the coupling device has an opening on the front end, the opening being adapted for coupling the accessory, wherein a side wall of the opening has at least one positioning pin in the form of a semi-sphere, wherein the at least one positioning pin is configured to be fitted by elastic deformation into at least one circular hole in the accessory, and wherein the opening has at least one hollowed out space in a bottom of the opening that is configured for receiving at least one flange emerging from a side edge of the accessory.

2. The display system for coupling to visual communication products according to claim 1, wherein the at least one circular hole comprises two circular holes, and wherein the at least one positioning pin comprises two positioning pins complementary to the two circular holes.

3. The display system for coupling to visual communication products according to claim 1, wherein the at least one flange emerging from the side edge of the accessory comprises two flanges and wherein the at least one hollowed out space comprises two hollowed-out spaces, said two flanges being configured be fitted into the two hollowed out spaces provided in the bottom of the opening of the coupling device.

4. The display system for coupling to visual communication products according to claim 2, wherein the opening of the coupling device includes a horizontal rib which fits in a horizontal groove provided in the accessory.

5. The display system for coupling to visual communication products according to claim 1, wherein the coupling device includes a nut-screw assembly configured to receive and fix other accessories to the coupling device.

6. The display system for coupling to visual communication products according to claim 1, further comprising a ferromagnetic disc, which is fixed to the coupling device by means of a nut-screw assembly so as to be flush with the coupling body, wherein the ferromagnetic disc forms a magnetic fixing means for other accessories which have complementary magnetic means.

7. The display system for coupling to visual communication products according to claim 1, wherein the coupling device is formed from a flexible and ductile plastic material.

8. The display system for coupling to visual communication products according to claim 1, wherein the accessory is formed from methacrylate.

* * * * *